United States Patent
Takeda

(10) Patent No.: US 10,124,810 B2
(45) Date of Patent: Nov. 13, 2018

(54) VEHICLE CONTROL DEVICE, VEHICLE CONTROL METHOD AND VEHICLE CONTROL PROGRAM

(71) Applicant: HONDA MOTOR CO., LTD., Tokyo (JP)

(72) Inventor: Masanori Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 96 days.

(21) Appl. No.: 15/229,440

(22) Filed: Aug. 5, 2016

(65) Prior Publication Data

US 2017/0036679 A1 Feb. 9, 2017

(30) Foreign Application Priority Data

Aug. 6, 2015 (JP) ................................ 2015-156208

(51) Int. Cl.
*B60W 50/00* (2006.01)
*G08G 1/16* (2006.01)
(Continued)

(52) U.S. Cl.
CPC ........ *B60W 50/0097* (2013.01); *B60W 40/04* (2013.01); *G05D 1/0289* (2013.01);
(Continued)

(58) Field of Classification Search
CPC ........... B60W 2750/308; B60W 40/04; B60W 50/0097; G05D 1/0289; G05D 2201/0213; G08G 1/166; G08G 1/167
See application file for complete search history.

(56) References Cited

U.S. PATENT DOCUMENTS

| | | | |
|---|---|---|---|
| 2013/0085976 A1* | 4/2013 | Bone ............... | B60W 30/18163 706/46 |
| 2014/0005908 A1* | 1/2014 | Kollberg ............... | B60W 10/06 701/96 |

(Continued)

FOREIGN PATENT DOCUMENTS

| | | |
|---|---|---|
| JP | 2002-307972 A | 10/2002 |
| JP | 2006-44326 A | 2/2006 |

(Continued)

OTHER PUBLICATIONS

Office Action dated Sep. 4, 2018, issued in counterpart Japanese Application No. 2015-156208, with English machine translation. (7 pages).

*Primary Examiner* — Dale Moyer
(74) *Attorney, Agent, or Firm* — Westerman, Hattori, Daniels & Adrian, LLP

(57) ABSTRACT

A vehicle control device includes a detection unit which detects a peripheral vehicle, the peripheral vehicle traveling around an own vehicle, and a prediction unit which refers to a detection result of the detection unit so as to predict position change of the peripheral vehicle, and in a case where a second vehicle, which travels in immediately back of the first vehicle, is predicted to catch up with a first vehicle between the first vehicle and the second vehicle, predicts position change of the second vehicle on the assumption that the second vehicle travels in a manner to follow the first vehicle while keeping a certain distance with respect to the first vehicle after the second vehicle catches up with the first vehicle.

8 Claims, 11 Drawing Sheets

(51) Int. Cl.
*G05D 1/02* (2006.01)
*B60W 40/04* (2006.01)

(52) U.S. Cl.
CPC .............. *G08G 1/166* (2013.01); *G08G 1/167* (2013.01); *B60W 2750/308* (2013.01); *G05D 2201/0213* (2013.01)

(56) References Cited

U.S. PATENT DOCUMENTS

2016/0297447 A1* 10/2016 Suzuki ................. B60W 30/16
2017/0131401 A1*  5/2017 Pascheka ............ B60W 30/095

FOREIGN PATENT DOCUMENTS

| JP | 2007-8298 A | 1/2007 |
| JP | 2008-117082 A | 5/2008 |
| JP | 2009-274594 A | 11/2009 |
| JP | 2015-51761 A | 3/2015 |

* cited by examiner

FIG. 7

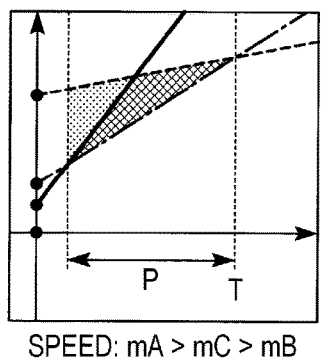

▨ : LANE CHANGEABLE REGION
▩ : POST-LANE-CHANGE PRESENCE ALLOWABLE REGION

—— DISPLACEMENT OF mA
---- DISPLACEMENT OF mB
—·— DISPLACEMENT OF mC

SPEED: mA > mC > mB

FIG. 8

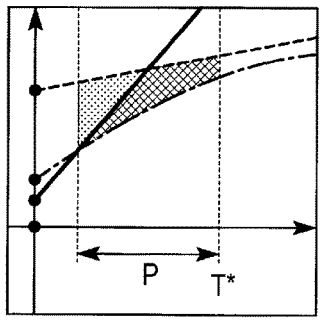

▨ : LANE CHANGEABLE REGION
▩ : POST-LANE-CHANGE PRESENCE ALLOWABLE REGION

—— DISPLACEMENT OF mA
---- DISPLACEMENT OF mB
—·— DISPLACEMENT OF mC

SPEED: mA > mC > mB

FIG. 9

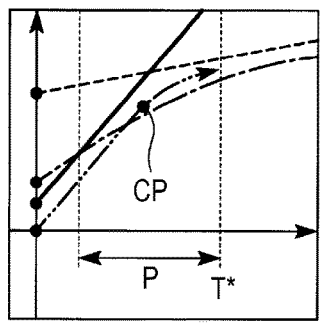

—— DISPLACEMENT OF mA
---- DISPLACEMENT OF mB
—·— DISPLACEMENT OF mC
—··— DISPLACEMENT OF OWN VEHICLE M

SPEED: mA > mC > mB

VEHICLE CONTROL DEVICE, VEHICLE CONTROL METHOD AND VEHICLE CONTROL PROGRAM

CROSS REFERENCES TO RELATED APPLICATIONS

The present application claims priority under 35 U.S.C. § 119 to Japanese Patent Application No. 2015-156208, filed Aug. 6, 2015, entitled "Vehicle Control Device, Vehicle Control Method, and Vehicle Control Program." The contents of this application are incorporated herein by reference in their entirety.

BACKGROUND

1. Field

The present disclosure relates to a vehicle control device, a vehicle control method, and a vehicle control program.

2. Description of the Related Art

A lane change support device is conventionally known which is provided with a first control mode for permitting a function for supporting lane change, a second control mode for prohibiting the function for supporting lane change, a road information acquisition part for acquiring road information when its own vehicle is traveling, a relative information acquisition part for acquiring relative information between its own vehicle and a peripheral vehicle, a selection part for selecting a control mode based on the road information acquired by the road acquisition part, and a control part for controlling its own vehicle based on the relative information acquired by the relative information acquisition part and the control mode selected by the selection part (refer to Japanese Unexamined Patent Application Publication No. 2009-274594, for example). In this device, the own vehicle is controlled based on a control mode selected on the assumption that a peripheral vehicle travels at a constant speed.

SUMMARY

However, in techniques of the related art, it has not been considered that peripheral vehicles travel at non-constant speed, so that it has been sometimes impossible to accurately predict position change of peripheral vehicles.

In light of the above-mentioned circumstances, it is desirable to provide a vehicle control device, a vehicle control method, and a vehicle control program which enable accurate prediction of position change of peripheral vehicles.

A vehicle control device according to a first aspect of the present disclosure includes a detection unit which detects a peripheral vehicle, the peripheral vehicle traveling around an own vehicle, to obtain positional information of the peripheral vehicle which may include any information related to its traveling state such as a vehicle position, lane position, speed, acceleration/deceleration rates of the vehicle, etc., and a prediction unit which refers to a detection result of the detection unit to detect positional relationship between detected vehicles such as a difference in traveling speeds so as to predict position change such as a future position of one of the peripheral vehicles, and in a case where a second vehicle, which travels in immediately back of a first vehicle, is predicted to catch up with the first vehicle between the first vehicle and the second vehicle, predicts position change of the second vehicle on the assumption that the second vehicle travels in a manner to follow the first vehicle while keeping a certain distance with respect to the first vehicle after the second vehicle catches up with the first vehicle.

According to a second aspect of the present disclosure, in a case where a peripheral vehicle, which is processed as the first vehicle, is lost by the detection unit, the prediction unit may set a first virtual vehicle corresponding to the first vehicle and in a case where the second vehicle is predicted to catch up with the first virtual vehicle, the prediction unit may predict position change of the second vehicle on an assumption that the second vehicle travels in a manner to follow the first virtual vehicle while keeping a certain distance with respect to the first virtual vehicle after the second vehicle catches up with the first virtual vehicle, in the first aspect of the present disclosure.

According to a third aspect of the present disclosure, in a case where a distance between the first vehicle and the second vehicle becomes within a reference distance, the prediction unit may set a second virtual vehicle on a lane adjacent to a lane on which the second vehicle travels, in the first or second aspect of the present disclosure.

According to a fourth aspect of the present disclosure, in a case where a speed of the second vehicle is higher than a speed of the first vehicle by a reference speed or higher, the prediction unit may set a second virtual vehicle on a lane adjacent to a lane on which the second vehicle travels, in any one of the first to third aspects of the present disclosure.

In a vehicle control method according to a fifth aspect of the present disclosure, a computer of a vehicle control device, which includes a detection unit which detects a position of a peripheral vehicle traveling around an own vehicle, refers to a detection result of the detection unit so as to predict position change of the peripheral vehicle, and in a case where a second vehicle, which travels in immediately back of a first vehicle, is predicted to catch up with the first vehicle between the first vehicle and the second vehicle, predicts position change of the second vehicle on the assumption that the second vehicle travels in a manner to follow the first vehicle while keeping a certain distance with respect to the first vehicle after the second vehicle catches up with the first vehicle.

A vehicle control program, according to a sixth aspect of the present disclosure, including the following instructions to make a computer of a vehicle control device, the vehicle control device including a detection unit which detects a peripheral vehicle traveling around an own vehicle, refer to a detection result of the detection unit so as to predict position change of the peripheral vehicle, and in a case where a second vehicle, which travels in immediately back of a first vehicle, is predicted to catch up with the first vehicle between the first vehicle and the second vehicle, predict position change of the second vehicle on the assumption that the second vehicle travels in a manner to follow the first vehicle while keeping a certain distance with respect to the first vehicle after the second vehicle catches up with the first vehicle. It is understood that such program may be provided in a form of a computer program product having instructions stored in a computer readable media and readable by a computer such as the vehicle control device to execute the above instructions.

According to the first, fifth, and sixth aspects of the present disclosure, in a case where a second vehicle, which travels in immediately back of a first vehicle, is predicted to catch up with the first vehicle between the first vehicle and the second vehicle, the prediction unit predicts position change of the second vehicle on the assumption that the second vehicle travels in a manner to follow the first vehicle while keeping a certain distance with respect to the first vehicle after the second vehicle catches up with the first vehicle. Accordingly, position change of the peripheral vehicle can be accurately predicted.

According to the second aspect of the present disclosure, in a case where a peripheral vehicle, which is processed as the first vehicle, is lost by the detection unit, the prediction unit sets a first virtual vehicle corresponding to the first vehicle and in a case where the second vehicle is predicted to catch up with the first virtual vehicle, the prediction unit predicts position change of the second vehicle on an assumption that the second vehicle travels in a manner to follow the first virtual vehicle while keeping a certain distance with respect to the first virtual vehicle after the second vehicle catches up with the first virtual vehicle. Accordingly, even in the case where a vehicle cannot be specified, position change of the peripheral vehicle can be accurately predicted.

According to the third aspect of the present disclosure, in a case where a distance between the first vehicle and the second vehicle becomes within a reference distance, the prediction unit sets a second virtual vehicle on a lane adjacent to a lane on which the second vehicle travels. Accordingly, it can be predicted that the first vehicle performs lane change and the own vehicle can be controlled based on a prediction result.

According to the fourth aspect of the present disclosure, in a case where a speed of the second vehicle is higher than a speed of the first vehicle by a reference speed or higher, the prediction unit sets a second virtual vehicle on a lane adjacent to a lane on which the second vehicle travels. Accordingly, it can be predicted that the first vehicle performs lane change and the own vehicle can be controlled based on a prediction result. The word "unit" used in this application may mean a physical part or component of computer hardware or any device including a controller, a processor, a memory, etc., which is particularly configured to perform functions or steps as disclosed in the application. In some implementations, the processes of the units may be implemented in software or firmware installed on physical hardware.

BRIEF DESCRIPTION OF THE DRAWINGS

FIG. 7 illustrates an example of a positional relationship among the own vehicle and the monitoring object vehicles.

FIG. 8 illustrates an example of a positional relationship among the own vehicle and the monitoring object vehicles in the case where a following travel model is applied.

FIG. 9 illustrates an example of a control plan for lane change generated by a control plan generation unit.

DESCRIPTION OF THE PREFERRED EMBODIMENTS

A vehicle control device, a vehicle control method, and a vehicle control program according to embodiments of the present disclosure will be described below with reference to the accompanying drawings.

First Embodiment

[Vehicle Configuration]

Figure 1:
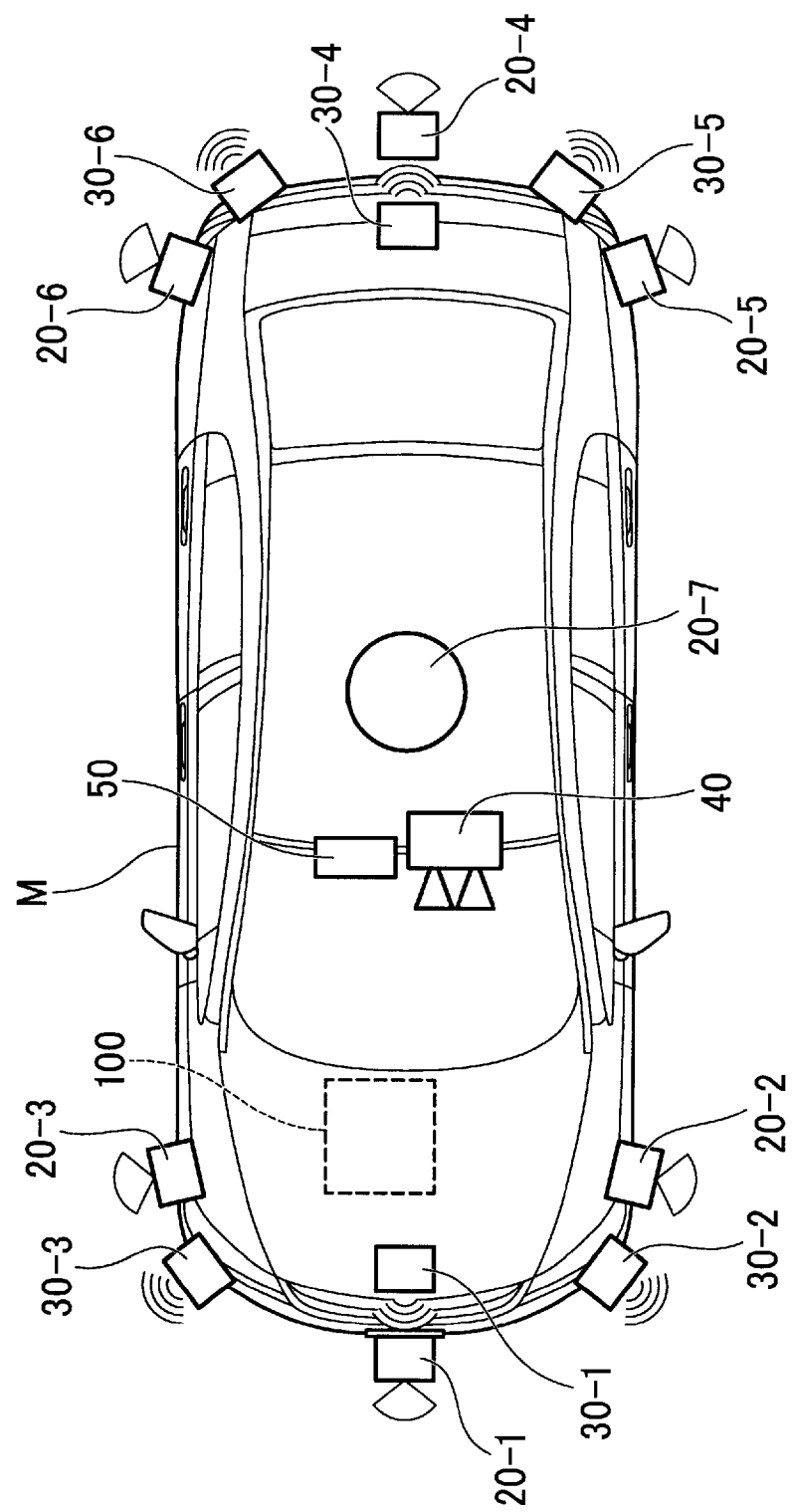
FIG. 1 illustrates constituent elements included in a vehicle (referred to below as an own vehicle) on which a vehicle control device according to a first embodiment is mounted.

FIG. 1 illustrates constituent elements included in a vehicle (referred to below as an own vehicle M) on which a vehicle control device 100 according to a first embodiment is mounted. A vehicle on which the vehicle control device 100 is mounted is a two-wheeled, three-wheeled, or four-wheeled vehicle, for example. Examples of the vehicle include a vehicle a power source of which is an internal-combustion engine such as a diesel engine and a gasoline engine, an electric vehicle a power source of which is an electric motor, a hybrid vehicle provided with both of an internal-combustion engine and an electric motor, and the like. Further, the above-mentioned electric vehicle is driven with power discharged from a battery such as a secondary cell, a hydrogen fuel cell, a metal fuel cell, and an alcohol fuel cell.

As illustrated in FIG. 1, range finders 20-1 to 20-7, radars 30-1 to 30-6, a sensor such as a camera 40, a navigation device 50, and the vehicle control device 100 mentioned above are mounted on a vehicle. The range finders 20-1 to 20-7 are a light detection and ranging or laser imaging detection and ranging (LIDAR) which measures scattering light with respect to irradiation light so as to measure a distance to an object, for example. The finder 20-1 is attached to a front grille or the like and the range finders 20-2 and 20-3 are attached to lateral surfaces or door mirrors of a vehicle, inside a headlight, near side lights, or the like, for example. The finder 20-4 is attached to a trunk lid or the like and the range finders 20-5 and 20-6 are attached to the lateral surfaces of the vehicle, inside a tail lamp, or the like. The detection range of the above-mentioned range finders 20-1 to 20-6 is approximately 150 degrees in the horizontal direction, for example. Further, the finder 20-7 is attached to a roof or the like. The detection range of the finder 20-7 is 360 degrees in the horizontal direction, for example.

The above-mentioned radars 30-1 and 30-4 are long distance millimeter wave radars whose detection range in the depth direction is wider than that of other radars, for example. Further, the radars 30-2, 30-3, 30-5, and 30-6 are intermediate distance millimeter wave radars whose detection range in the depth direction is narrower than that of the radars 30-1 and 30-4. Hereinafter, the range finders 20-1 to 20-7 are referred to merely as the "finder 20" when the range finders 20-1 to 20-7 are not especially discriminated from each other and the radars 30-1 to 30-6 are referred to merely as the "radar 30" when the radars 30-1 to 30-6 are not especially discriminated from each other. The radar 30 detects an object by a frequency modulated continuous wave (FM-CW) method, for example.

The camera 40 is a digital camera using a solid-state imaging element such as a charge coupled device (CCD) and a complementary metal oxide semiconductor (CMOS), for example. The camera 40 is attached to the upper part of a front windshield, to a rear surface of a rearview mirror, or the like. The camera 40 repeatedly images the front of the own vehicle M periodically, for example.

Here, the configuration illustrated in FIG. 1 is merely an example, so that a part of the configuration may be omitted or other configurations may be further added.

Figure 2:
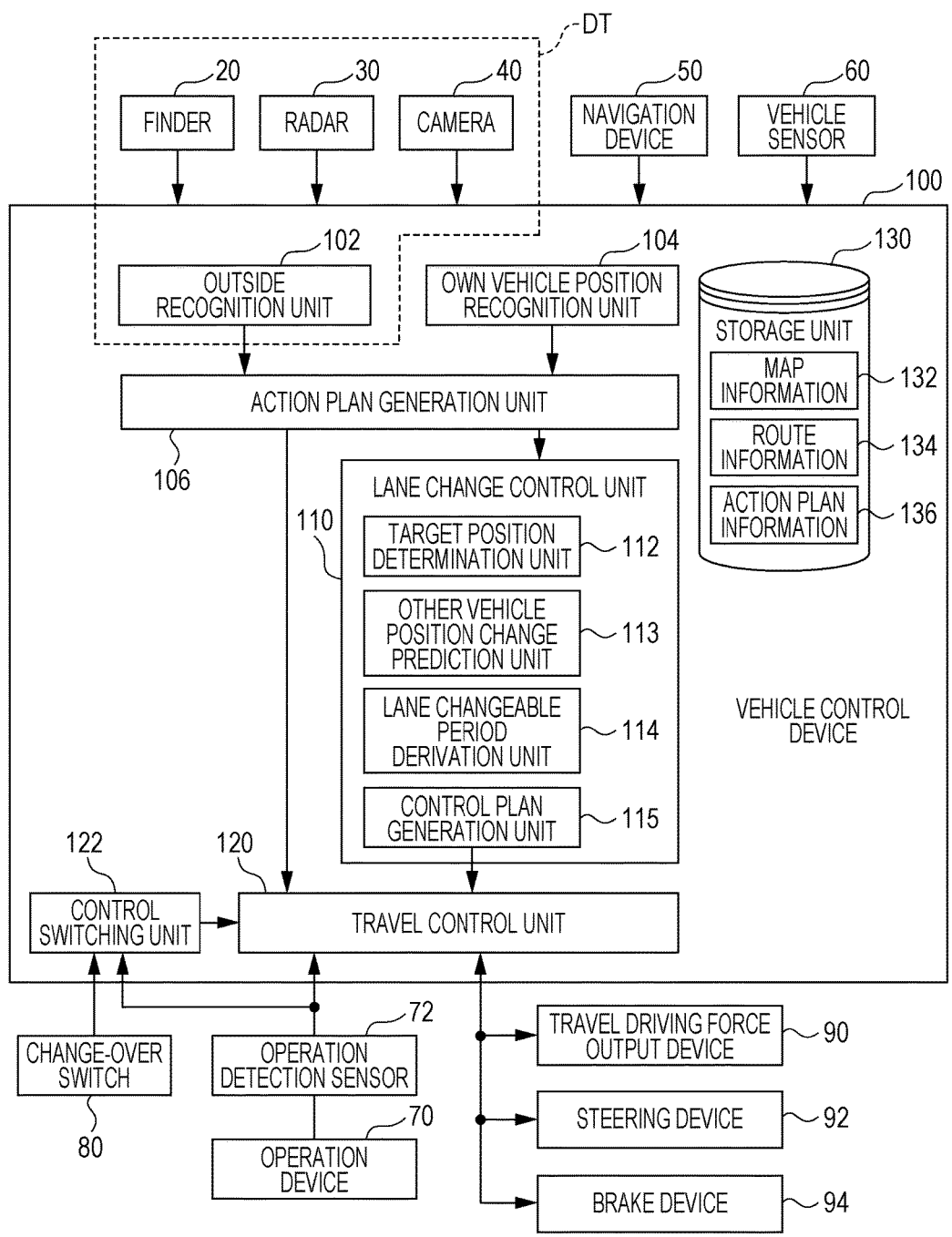
FIG. 2 is a functional configuration diagram illustrating the own vehicle while focusing the vehicle control device according to the first embodiment.

FIG. 2 is a functional configuration diagram illustrating the own vehicle M while focusing the vehicle control device 100 according to the first embodiment. On the own vehicle M, the navigation device 50, a vehicle sensor 60, an operation device 70, an operation detection sensor 72, a change-over switch 80, a travel driving force output device 90, a steering device 92, a brake device 94, and the vehicle control device 100 as well as the finder 20, the radar 30, and the camera 40 are mounted.

The navigation device 50 includes a global navigation satellite system (GNSS) receiver, map information (navigation map), and a touch panel type display device, a speaker, a microphone, which function as user interfaces, for example. The navigation device 50 specifies a position of the own vehicle M by the GNSS receiver so as to derive a route from the specified position to a destination which is specified by a user. The route derived by the navigation device 50 is stored as route information 134 in a storage unit 130. The position of the own vehicle M may be specified or complemented by an inertial navigation system (INS) using an output of the vehicle sensor 60. Further, the navigation device 50 performs guidance of a route to a destination by sound or navigation display when the vehicle control device 100 executes a manual driving mode. Here, the configuration for specifying a position of the own vehicle M may be provided independently from the navigation device 50. Further, the navigation device 50 may be realized by one function of a terminal device such as a smartphone and a tablet terminal which is possessed by a user, for example. In this case, the terminal device and the vehicle control device 100 send and receive information to and from each other wirelessly or with wires.

Examples of the vehicle sensor 60 include a vehicle speed sensor for detecting a speed (vehicle speed) of the own vehicle M, an accelerator sensor for detecting an acceleration rate, a yaw rate sensor for detecting an angular speed around the vertical axis, an azimuth sensor for detecting the direction of the own vehicle M, and the like.

Examples of the operation device 70 include an accelerator pedal, a steering wheel, a brake pedal, a shift lever, and the like. To the operation device 70, the operation detection sensor 72 for detecting presence/absence and an amount of an operation performed by a driver is attached. Examples of the operation detection sensor 72 include an accelerator opening sensor, a steering torque sensor, a brake sensor, a shift position sensor, and the like. The operation detection sensor 72 outputs an accelerator opening degree, steering torque, a brake depressing amount, a shift position, and the like, which are detection results, to a travel control unit 120. Alternatively, the detection results of the operation detection sensor 72 may be directly outputted to the travel driving force output device 90, the steering device 92, or the brake device 94.

The change-over switch 80 is operated by a driver or the like. The change-over switch 80 may be a mechanical switch or a graphical user interface (GUI) switch which is provided to the touch panel type display device of the navigation device 50. The change-over switch 80 receives a switching instruction between a manual driving mode in which a driver drives manually and an automatic driving mode in which the own vehicle M travels in a state that a driver does not operate (or the operation amount is smaller or the operation frequency is lower than that in the manual driving mode) and generates a control mode specification signal for specifying the control mode executed by the travel control unit 120 to either one of the automatic driving mode and the manual driving mode.

The travel driving force output device 90 includes one or both of an engine and a traction motor, for example. In the case where the travel driving force output device 90 includes only an engine, the travel driving force output device 90 further includes an engine electronic control unit (ECU) for controlling the engine. The engine ECU adjusts a throttle opening degree, a shift stage, and the like in accordance with information inputted from the travel control unit 120, for example, so as to control the travel driving force (torque) by which the vehicle travels. In the case where the travel driving force output device 90 includes only a traction motor, the travel driving force output device 90 includes a motor ECU for driving the traction motor. The motor ECU adjusts a duty ratio of a PWM signal which is applied to the traction motor, for example, so as to control the travel driving force by which the vehicle travels. In the case where the travel driving force output device 90 includes both of an engine and a traction motor, the engine ECU and the motor ECU control the travel driving force in a coordinated manner.

The steering device 92 is provided with an electric motor which is capable of changing the direction of a steering wheel by applying force to a rack and pinion function and the like, a steering angle sensor for detecting a steering angle (or an actual steering angle), and the like, for example. The steering device 92 drives the electric motor in accordance with information inputted from the travel control unit 120.

The brake device 94 is provided with a master cylinder to which a brake operation performed to a brake pedal is transmitted as hydraulic pressure, a reservoir tank for storing brake fluid, a brake actuator for adjusting braking force outputted to each wheel, and the like. The brake device 94 controls the brake actuator and the like in accordance with information inputted from the travel control unit 120 so that a desired magnitude of brake torque is outputted to each wheel. Here, the brake device 94 is not limited to the electronically controlled brake device which is described above and is operated by hydraulic pressure but may be an electronically controlled brake device which is operated by an electric actuator.

[Vehicle Control Device]

The vehicle control device 100 will be described below. The vehicle control device 100 includes an outside recognition unit 102, an own vehicle position recognition unit 104, an action plan generation unit 106, a lane change control unit 110, the travel control unit 120, a control switching unit 122, and the storage unit 130, for example. Part or all of the outside recognition unit 102, the own vehicle position recognition unit 104, the action plan generation unit 106, the lane change control unit 110, the travel control unit 120, and the control switching unit 122 is a software function unit which functions when a processor such as a central processing unit (CPU) executes a program.

Further, part or all of these units may be a hardware function unit such as a large scale integration (LSI) and an application specific integrated circuit (ASIC). Further, the storage unit 130 is realized by a read only memory (ROM), a random access memory (RAM), a hard disk drive (HDD), a flash memory, and the like. The program may be preliminarily stored in the storage unit 130 or may be downloaded from an external device via on-vehicle internet equipment or the like. Further, a portable storage medium in which the program is stored may be mounted on a drive device, which is not illustrated, so as to install the program on the storage unit 130.

The outside recognition unit 102 recognizes states of a peripheral vehicle such as a position and a speed based on outputs from the finder 20, the radar 30, the camera 40, and the like. A peripheral vehicle in the present embodiment represents a vehicle which travels around the own vehicle M in the same direction as that of the own vehicle M. A position of a peripheral vehicle may be expressed by a representative point such as a center of gravity or a corner of another vehicle or may be expressed by a region defined by an outline of another vehicle. The "state" of a peripheral vehicle may include an acceleration rate of the peripheral vehicle and whether or not the peripheral vehicle changes lanes (or whether or not the peripheral vehicle is trying to change lanes) based on information of the above-mentioned each device. The outside recognition unit 102 recognizes whether or not a peripheral vehicle changes lanes (or whether or not the peripheral vehicle is trying to change lanes) based on a history of a position of the peripheral vehicle, an operating state of a direction indicator, and the like. Further, the outside recognition unit 102 may recognize positions of a guardrail, a telephone pole, a parked vehicle, a pedestrian, and other objects, in addition to a peripheral vehicle. What is composed of the finder 20, the radar 30, the camera 40, and the outside recognition unit 102 is referred to below as a "detection unit DT" which detects a peripheral vehicle. The detection unit DT may further recognize states of a peripheral vehicle such as a position and a speed through communication with the peripheral vehicle.

Figure 3:
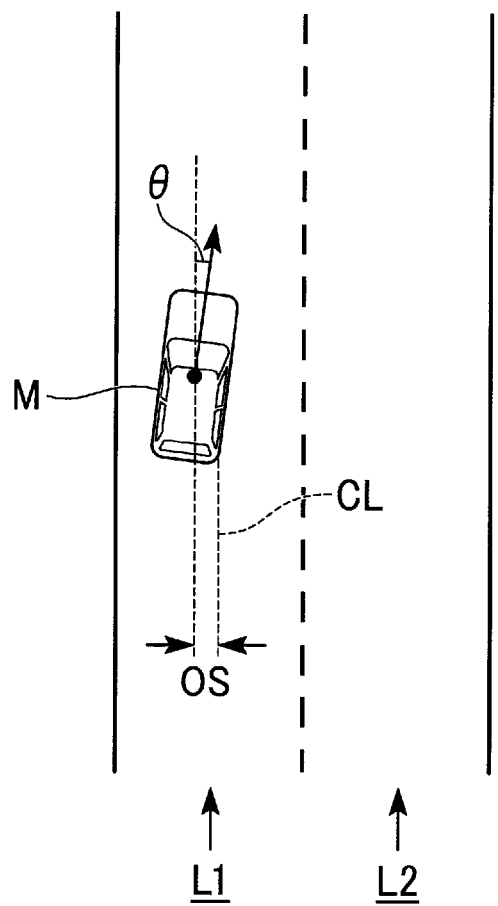
FIG. 3 illustrates a state that an own vehicle position recognition unit recognizes a relative position of the own vehicle with respect to a traveling lane.

The own vehicle position recognition unit 104 recognizes a lane (own lane) on which the own vehicle M travels and a relative position of the own vehicle M with respect to a traveling lane based on map information 132 stored in the storage unit 130 and information inputted from the finder 20, the radar 30, the camera 40, the navigation device 50, or the vehicle sensor 60. The map information 132 exhibits higher accuracy than a navigation map owned by the navigation device 50 and includes information of the center of the lane or information of a boundary of the lane, for example. FIG. 3 illustrates a state that the own vehicle position recognition unit 104 recognizes a relative position of the own vehicle M with respect to a traveling lane. The own vehicle position recognition unit 104 recognizes deviation OS from a traveling lane center CL which is a reference point (for example, a center of gravity) of the own vehicle M and an angle θ with respect to a line formed by lining up traveling lane centers CL in the proceeding direction of the own vehicle M, as a relative position of the own vehicle M with respect to the traveling lane. Here, instead of this, the own vehicle position recognition unit 104 may recognize a position of the reference point of the own vehicle M with respect to either one lateral end portion of an own lane L1, for example, as a relative position of the own vehicle M with respect to the traveling lane.

The action plan generation unit 106 generates an action plan in a predetermined interval. The predetermined interval represents an interval in which the own vehicle M passes through a toll road such as an expressway in a route derived by the navigation device 50, for example. Not limited to this, the action plan generation unit 106 may generate an action plan for an arbitrary interval.

An action plan is composed of a plurality of events which are sequentially executed, for example. Examples of an event include a deceleration event in which the own vehicle M is decelerated, an acceleration event in which the own vehicle M is accelerated, a lane keep event in which the own vehicle M is allowed to travel so as not to deviate from a traveling lane, a lane change event in which the own vehicle M is allowed to change traveling lanes, an overtaking event in which the own vehicle M is allowed to overtake a forward vehicle, a divergence event in which the own vehicle M is allowed to change a lane to a desired lane on a diverging point or allowed to travel so as not to deviate from the present traveling lane, a merging event in which the own vehicle M is accelerated and decelerated on a lane merging point so as to allow the own vehicle M to change traveling lanes, and the like. For example, in the case where there is a junction (diverging point) in a toll road (an expressway or the like, for example), the vehicle control device 100 needs to change lanes or to keep a lane so as to allow the own vehicle M to proceed to the direction of a destination, in the automatic driving mode. Accordingly, when the action plan generation unit 106 refers to the map information 132 and it becomes clear that there is a junction on a route, the action plan generation unit 106 sets a lane change event for changing a lane to a desired lane on which the own vehicle M can proceed in a direction to a destination in an interval from a present position (coordinate) of the own vehicle M to a position (coordinate) of the junction.

Figure 4:
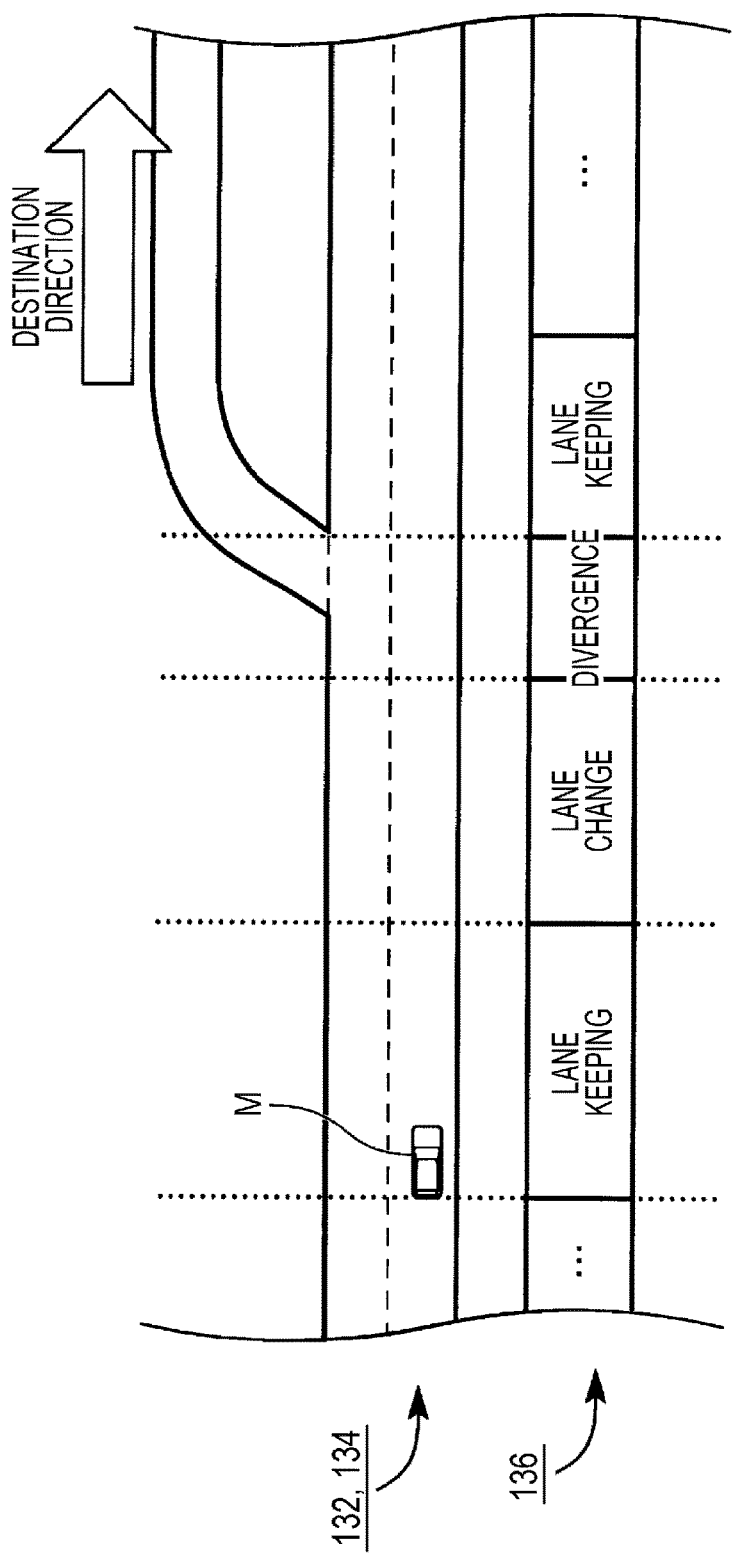
FIG. 4 illustrates an example of an action plan generated for a certain interval.

FIG. 4 illustrates an example of an action plan generated for a certain interval. As illustrated in FIG. 4, the action plan generation unit 106 classifies situations occurring when the own vehicle M travels along a route to a destination and generates an action plan so that events conforming to individual situations are executed. Here, the action plan generation unit 106 may dynamically change an action plan in accordance with situation change of the own vehicle M.

[Lane Change Event]

The lane change control unit 110 performs control in execution of the lane change event included in the action plan generated by the action plan generation unit 106. The lane change control unit 110 includes a target position determination unit 112, an other vehicle position change prediction unit 113, a lane changeable period derivation unit 114, and a control plan generation unit 115, for example.

The target position determination unit 112 determines a lane change target position T which is a target position of lane change, based on positions of peripheral vehicles.

The other vehicle position change prediction unit 113 predicts future position change of peripheral vehicles (three peripheral vehicles in the example below) which are likely to interfere with lane change among peripheral vehicles which are detected by the detection unit DT. The peripheral vehicles which are likely to interfere with lane change are referred to below as monitoring object vehicles mA, mB, and mC.

The lane changeable period derivation unit 114 derives a lane changeable period P with respect to the lane change target position T based on position change of the monitoring object vehicles mA, mB, and mC which is predicted by the other vehicle position change prediction unit 113.

Figure 5:
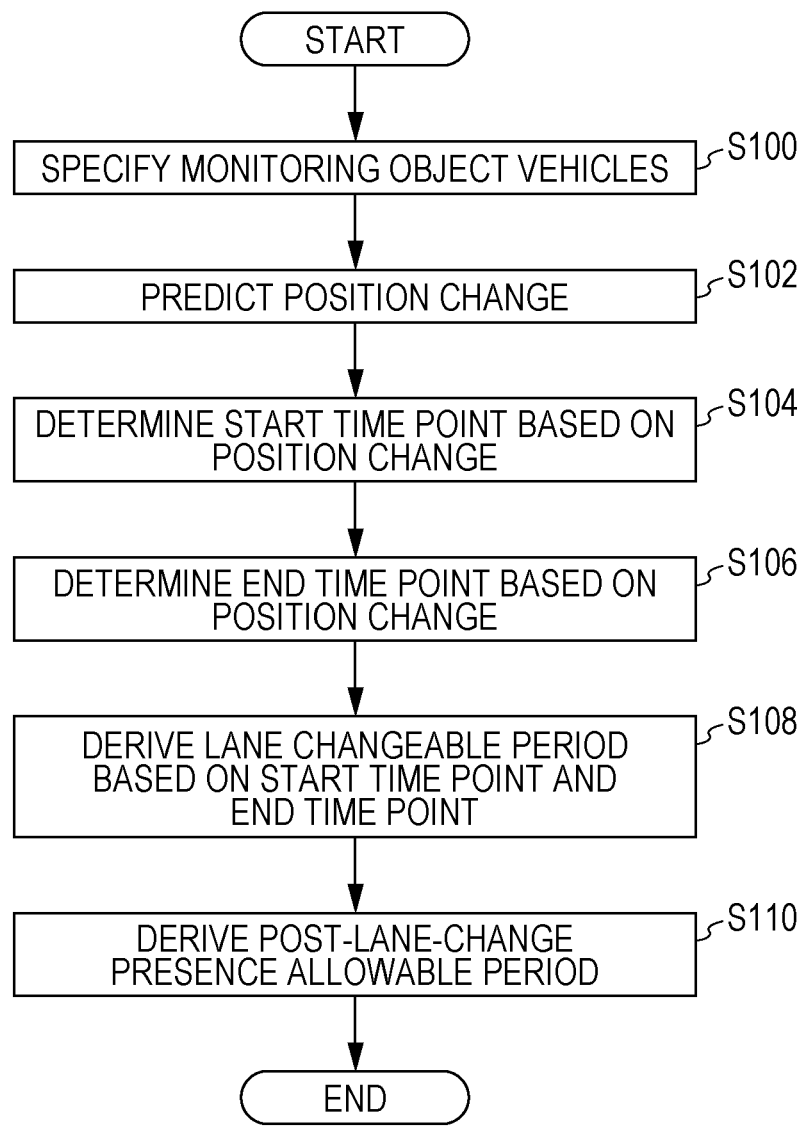
FIG. 5 is a flowchart illustrating an example of a flow of processing for deriving a post-lane-change presence allowable period.

Processing of the target position determination unit 112, the other vehicle position change prediction unit 113, and the lane changeable period derivation unit 114 is described below with reference to a flowchart. FIG. 5 is a flowchart illustrating an example of a flow of processing for deriving a post-lane-change presence allowable period.

Figure 6:
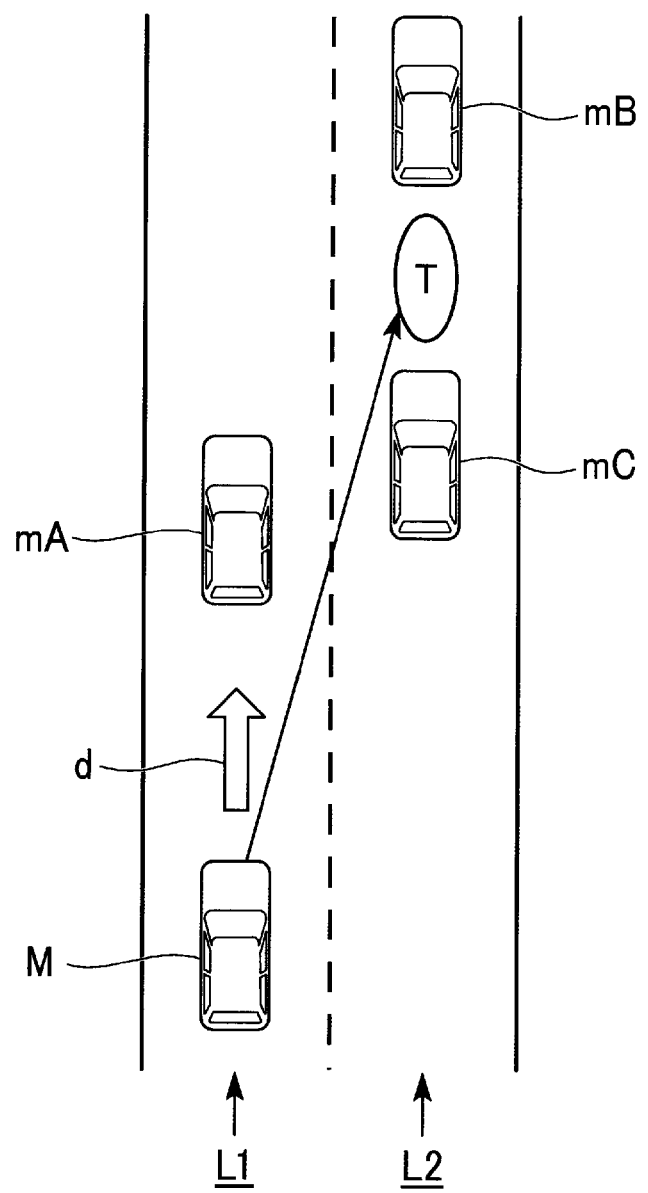
FIG. 6 illustrates an example of a positional relationship among monitoring object vehicles, the own vehicle, and a lane change target position.

The other vehicle position change prediction unit 113 first specifies the monitoring object vehicles mA, mB, and mC (step S100). A relationship among the own vehicle M and the monitoring object vehicles mA, mB, and mC (position distribution) is categorized into six patterns as mA-mB-M-mC, mB-mA-M-mC, mA-M-mB-mC, . . . , for example. Here, a vehicle which is put earlier in the order in the patterns represents a vehicle which travels more forward. FIG. 6 illustrates an example of a positional relationship among monitoring object vehicles, the own vehicle, and a lane change target position. In FIG. 6, it is assumed that the positional relationship among the monitoring object vehicles is mB-mC-mA-M. The monitoring object vehicle mA is a vehicle which travels in immediate front of the own vehicle M (referred to below as a preceding vehicle) in a lane same as that of the own vehicle M. Further, the monitoring object vehicle mB is a peripheral vehicle which travels in immediate front of the lane change target position T and the monitoring object vehicle mC is a peripheral vehicle which travels in immediate back of the lane change target position T.

Then, the other vehicle position change prediction unit 113 predicts future position change of the monitoring object vehicles mA, mB, and mC (step S102). Here, the future position change of step S102 described above can be predicted based on a constant speed model in which it is assumed that a vehicle travels while keeping a present speed, a constant acceleration model in which it is assumed that a vehicle travels while keeping a present acceleration rate, or other various types of models, for example. The position change of the monitoring object vehicles mA, mB, and mC is categorized into six patterns as mA>mB>mC, mA>mC>mB, mB>mA>mC, . . . , based on speeds of the monitoring object vehicles, for example. FIG. 7 illustrates an example of a positional relationship among the own vehicle and the monitoring object vehicles. In FIG. 7, it is assumed that speeds of the monitoring object vehicles are mA>mC>mB. A vertical axis in FIG. 7 represents displacement with respect to a proceeding direction based on the own vehicle M and a horizontal axis represents elapsed time. In FIG. 7, the post-lane-change presence allowable region represents a region in which the own vehicle M can be present after performing a lane change in the case where monitoring object vehicles continue to travel in the same propensity. For example, in the case of "speed: mA>mC>mB", the own vehicle M is restricted so that the own vehicle M does not go ahead of the monitoring object vehicle mA when the lane changeable region is on the lower side of displacement of the monitoring object vehicle mA, that is, before the own vehicle M performs lane change. While, after the own vehicle M performs the lane change, any problem does not occur even though the own vehicle M goes ahead of the monitoring object vehicle mA. This post-lane-change presence allowable region is used for processing of the control plan generation unit 115.

In the case where future position change is predicted based on the constant speed model, for example, the monitoring object vehicle mC overtakes the monitoring object vehicle mB after time T in the example of FIG. 7. However, there is such case in reality that when the monitoring object vehicle mC approaches the monitoring object vehicle mB, the monitoring object vehicle mC decelerates to avoid collision and travels in a manner to follow the monitoring object vehicle mB while keeping a certain distance to the monitoring object vehicle mB after the deceleration. Therefore, there has been a case where position change cannot be accurately predicted when future position change is predicted only based on the constant speed model.

On the other hand, the vehicle control device 100 according to the present embodiment applies a following travel model as appropriate so as to predict a future position of a peripheral vehicle. The following travel model is a model in which it is assumed that a following vehicle travels in a manner to follow a forward vehicle while keeping a certain distance to the forward vehicle. FIG. 8 illustrates an example of change of a positional relationship among the own vehicle and the monitoring object vehicles in the case where the following travel model is applied. The other vehicle position change prediction unit 113 assumes that the monitoring object vehicle mC starts traveling in a manner to follow the monitoring object vehicle mB while keeping a certain distance to the monitoring object vehicle mB at time T* which is slightly before time T, at which it is predicted that the monitoring object vehicle mC catches up with the monitoring object vehicle mB, (or at a time point when the monitoring object vehicle mC approaches to a certain distance) according to the following travel model. Accordingly, the other vehicle position change prediction unit 113 can predict position change while reflecting a following travel state which likely occurs in the case where a certain vehicle catches up with another vehicle. As a result, the other vehicle position change prediction unit 113 can accurately predict position change of the peripheral vehicles.

Subsequently, the lane changeable period derivation unit 114 determines a start time point of a lane changeable period based on position change of the monitoring object vehicles mA, mB, and mC which is predicted by the other vehicle position change prediction unit 113 (step S104).

Here, in determination of a start time point of lane change, there are elements which are "a time point when the monitoring object vehicle mA overtakes the monitoring object vehicle mC" and "a time point when the own vehicle M overtakes the monitoring object vehicle mC". In order to obtain these elements, assumption related to acceleration and deceleration of the own vehicle M is required. On this point, in the case of the acceleration, for example, the lane changeable period derivation unit 114 derives a speed change curve with a legal speed limit as the upper limit within a range in which sudden acceleration is not required from a present speed of the own vehicle M and determines "a time point when the own vehicle M overtakes the monitoring object vehicle mC" while taking position change of the monitoring object vehicle mC into account.

Subsequently, the lane changeable period derivation unit 114 determines an end time point of the lane changeable period based on the position change of the monitoring object vehicles mA, mB, and mC which is predicted by the other vehicle position change prediction unit 113 (step S106). The lane changeable period derivation unit 114 determines time when the monitoring object vehicle mC catches up with the monitoring object vehicle mB and accordingly the distance between the monitoring object vehicle mC and the monitoring object vehicle mB becomes a predetermined distance, for example, as an end time point. Then, the lane changeable period derivation unit 114 derives a lane changeable period based on the start time point determined in step S104 and the end time point determined in step S106 (step S108). Further, the lane changeable period derivation unit 114 preliminarily derives a post-lane-change presence allowable period (step S110). Then, the processing of the present flowchart is ended.

[Control Plan]

The control plan generation unit 115 generates a control plan for lane change, with respect to the lane change target position T which is determined by the target position determination unit 112, based on the position change of the monitoring object vehicles mA, mB, and mC which is predicted by the other vehicle position change prediction unit 113.

FIG. 9 illustrates an example of a control plan for lane change generated by the control plan generation unit 115. The control plan generation unit 115 first obtains a limit of the speed, by which the own vehicle M can enter the lane changeable region, of the own vehicle M. The limit of the speed of the own vehicle M allows the own vehicle M to enter the lane changeable region within the lane changeable period P. Further, the limit of the speed of the own vehicle M may allow the own vehicle M to travel in a manner to follow the monitoring object vehicle mB which is a preceding vehicle after lane change. In this case, the own vehicle M may deviate from the lane changeable region and enter a post-lane-change presence allowable region at a time point when the own vehicle M starts the following travel.

Further, the own vehicle M needs to perform lane change after overtaking the monitoring object vehicle mC in the situation illustrated in the drawing, such that the control plan generation unit 115 generates a control plan so that the own vehicle M starts the lane change at a point on which displacement (e.g., free space) in front of the own vehicle M becomes sufficiently larger than displacement in front of the monitoring object vehicle mC (CP in FIG. 9). In other words, the own vehicle M may have a trajectory that ensures that before, during, and after the lane change there is sufficient room behind mB and/or sufficient room in front of mC so as to have a safe lane change.

By such control, the lane change control unit 110 can realize smooth lane change control.

[Travel Control]

The travel control unit 120 sets a control mode to the automatic driving mode or the manual driving mode through the control by the control switching unit 122 so as to control a control object in accordance with the control mode which is set. The travel control unit 120 reads in action plan information 136 generated by the action plan generation unit 106 in the automatic driving mode so as to control a control object based on an event included in the action plan information 136 which is read. In the case where this event is the lane change event, the travel control unit 120 determines a control amount of the electric motor (the number of revolutions, for example) in the steering device 92 and a control amount of the ECU (a throttle opening degree, a shift stage, and the like, for example) in the travel driving force output device 90, in accordance with the control plan generated by the control plan generation unit 115. The travel control unit 120 outputs information representing the control amount which is determined for each event to a corresponding control object. Accordingly, each of the devices (90, 92, 94) which are control objects can control their own devices in accordance with information which represents the control amount and is inputted from the travel control unit 120. Further, the travel control unit 120 appropriately adjusts the determined control amount based on a detection result of the vehicle sensor 60.

Further, the travel control unit 120 controls a control object based on an operation detection signal outputted from the operation detection sensor 72 in the manual driving mode. For example, the travel control unit 120 directly outputs an operation detection signal outputted from the operation detection sensor 72 to each of the devices which are the control objects.

The control switching unit 122 switches the control mode of the own vehicle M for the travel control unit 120 from the automatic driving mode to the manual driving mode or from the manual driving mode to the automatic driving mode based on the action plan information 136 generated by the action plan generation unit 106. Further, the control switching unit 122 switches the control mode of the own vehicle M for the travel control unit 120 from the automatic driving mode to the manual driving mode or from the manual driving mode to the automatic driving mode based on a control mode specification signal inputted from the change-over switch 80. That is, the control mode of the travel control unit 120 can be arbitrarily changed through an operation of a driver or the like during traveling or parking.

Further, the control switching unit 122 switches the control mode of the own vehicle M for the travel control unit 120 from the automatic driving mode to the manual driving mode based on an operation detection signal inputted from the operation detection sensor 72. For example, the control switching unit 122 switches the control mode of the travel control unit 120 from the automatic driving mode to the manual driving mode in the case where the operation amount included in the operation detection signal exceeds a threshold value, that is, in the case where the operation device 70 receives an operation at the operation amount exceeding the threshold value. For example, in the case where a steering hole, an accelerator pedal, or a brake pedal is operated by a driver at the operation amount exceeding a threshold value when the own vehicle M is allowed to automatically travel by the travel control unit 120 which is set in the automatic driving mode, the control switching unit 122 switches the control mode of the travel control unit 120 from the automatic driving mode to the manual driving mode. Accordingly, the vehicle control device 100 can immediately switch the control mode to the manual driving mode, without an operation of the change-over switch 80, in accordance with an operation which is promptly performed by a driver when an object such as a human runs out into a road or when a forward vehicle suddenly stops, for example. As a result, the vehicle control device 100 can respond to an operation by a driver in emergency and thus enhance safety in traveling.

According to the vehicle control device 100 of the first embodiment described above, the lane changeable period derivation unit 114 derives the lane changeable period P in which lane change can be performed, based on position change of peripheral vehicles (monitoring object vehicles) and thus, the lane changeable period P can be used for various types of processing such as generation of a control plan for lane change. Further, the vehicle control device 100 of the first embodiment derives position change of peripheral vehicles based on the following travel model and thus, the vehicle control device 100 is capable of accurately predicting position change of peripheral vehicles.

Furthermore, according to the vehicle control device 100 of the first embodiment, the control plan generation unit 115 derives a limit of a speed for changing a lane to the lane change target position T within the lane changeable period P derived by the lane changeable period derivation unit 114 and generates a control plan under the derived limit of the speed. Accordingly, generation of an unrealizable control plan can be suppressed.

Second Embodiment

A second embodiment will be described below. A vehicle control device 100 in the second embodiment is different from the vehicle control device 100 of the first embodiment in that the vehicle control device 100 of the second embodiment sets a virtual vehicle (a first virtual vehicle) when a vehicle is lost. Description is given below in a manner to focus on this difference.

Figure 10:
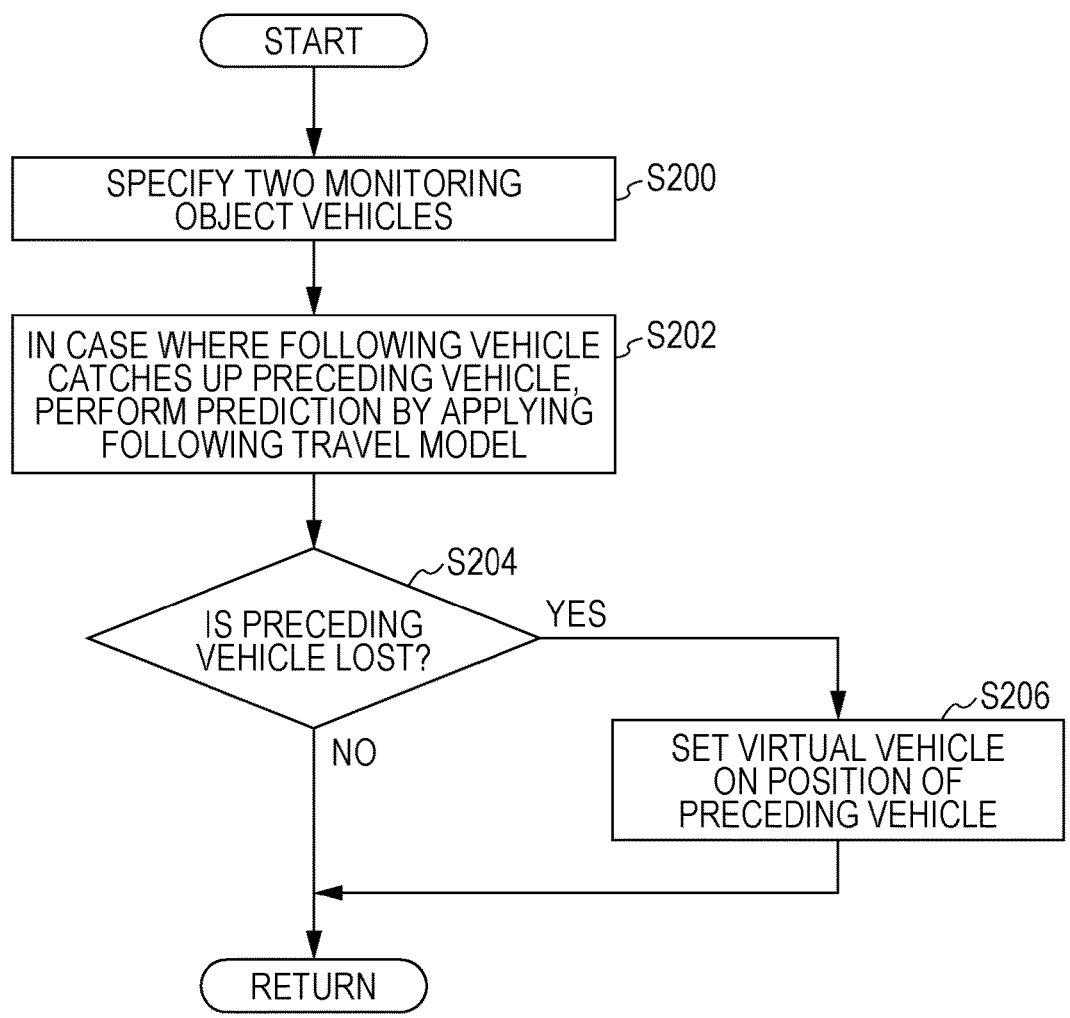
FIG. 10 is a flowchart illustrating a flow of processing of a vehicle control device according to a second embodiment.

FIG. 10 is a flowchart illustrating a flow of processing of the vehicle control device 100 according to the second embodiment. This processing is repeatedly executed while it is determined that "the own vehicle is traveling", for example. The other vehicle position change prediction unit 113 first specifies two peripheral vehicles which are detected by the detection unit DT and travel in front of the own vehicle in a state that the two peripheral vehicles travel immediately ahead and immediately back of each other on the identical lane, as monitoring object vehicles (step S200). Subsequently, in the case where the vehicle traveling behind (referred to below as a "following vehicle") catches up with a vehicle traveling ahead (referred to below as a "preceding vehicle") between the two monitoring object vehicles which are specified in step S200, the other vehicle position change prediction unit 113 predicts position change of the following vehicle by applying the following travel model (step S202).

Then, the other vehicle position change prediction unit 113 determines whether or not the preceding vehicle is lost (step S204). In the case where it is determined that the preceding vehicle is lost, the other vehicle position change prediction unit 113 sets a virtual vehicle on a position of the preceding vehicle (step S206). After the processing for setting a virtual vehicle on a position of the preceding vehicle is performed or in the case where it is determined that the preceding vehicle is not lost, one routine of this processing is ended.

In the above-described processing, when a virtual vehicle is set on a position of the preceding vehicle (step S206), the other vehicle position change prediction unit 113 specifies, in processing of the following routine, the virtual vehicle which is set in the processing of the preceding routine and a following vehicle of the virtual vehicle among peripheral vehicles detected by the detection unit DT (step S200). Then, in the case where the following vehicle specified in step S200 catches up with the virtual vehicle which is set in the processing of the preceding routine, the other vehicle position change prediction unit 113 may predict position change of the following vehicle by applying the following travel model (step S202).

The vehicle control device 100 predicts future positions of peripheral vehicles by applying the following travel model as appropriate. The following travel model in the present embodiment is a model in which it is assumed that a following vehicle travels in a manner to follow a virtual vehicle (forward vehicle), which is set, while keeping a certain distance to the virtual vehicle. Accordingly, the other vehicle position change prediction unit 113 can predict position change while reflecting a following travel state which likely occurs when a certain vehicle catches up with another vehicle. As a result, the other vehicle position change prediction unit 113 can accurately predict position change of peripheral vehicles.

Figure 11:
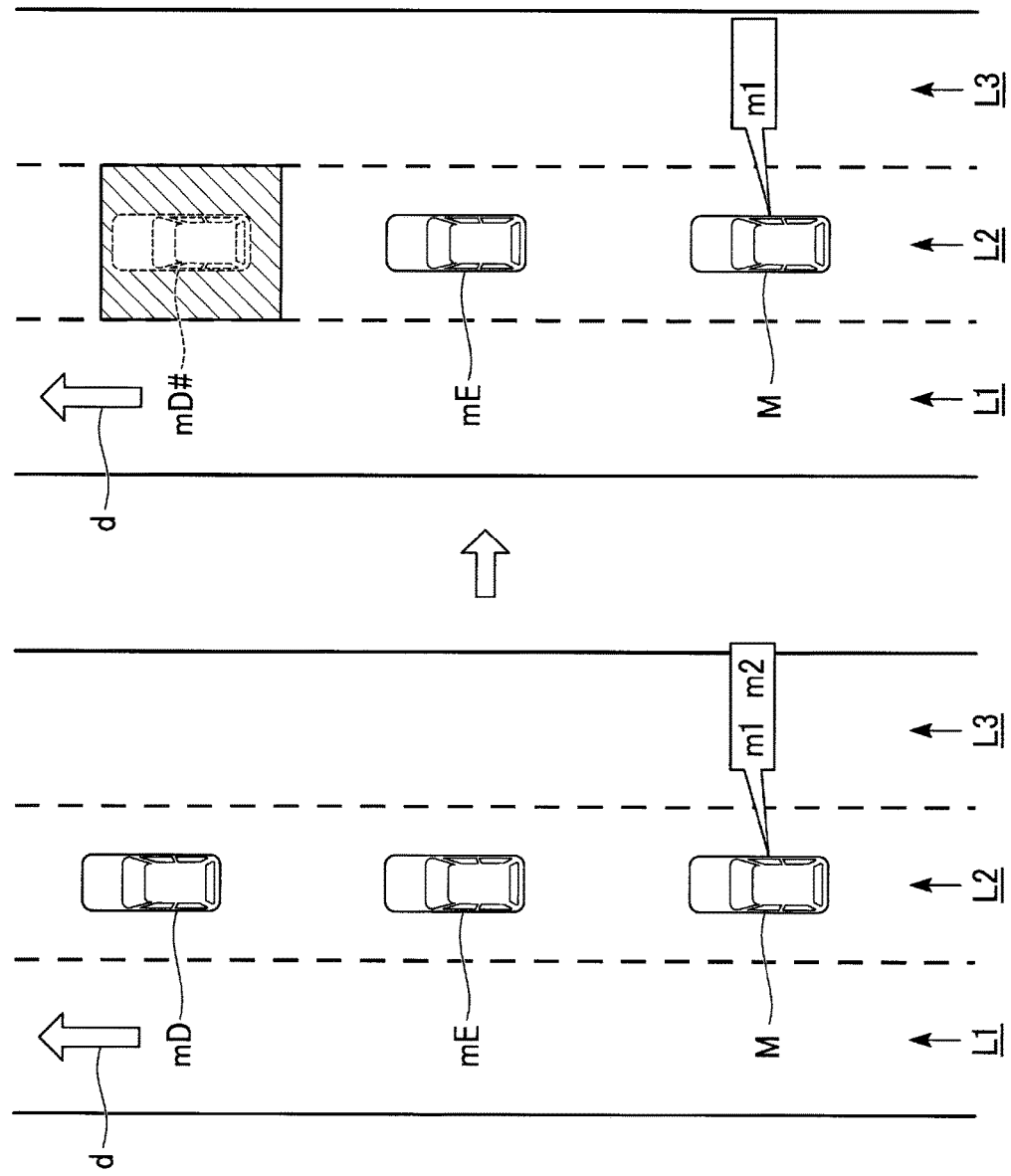
FIG. 11 illustrates an example of a situation in which a preceding vehicle is lost.

FIG. 11 illustrates an example of a situation in which a preceding vehicle is lost. In an example illustrated in FIG. 11, it is assumed that the other vehicle position change prediction unit 113 can recognize a preceding vehicle mD at a certain time (left figure). In a predetermined period of time from the certain time, light from the finder 20, radio waves from the radar 30, and the like of the preceding vehicle mD traveling on an own lane L2 are interrupted by a following vehicle mE, so that the other vehicle position change prediction unit 113 cannot recognize the preceding vehicle mD from the own vehicle M which is following the following vehicle mE.

In this case, the other vehicle position change prediction unit 113 predicts presence of the preceding vehicle mD based on a position, an acceleration rate, a speed, and the like of the preceding vehicle mD before being lost; based on a position, an acceleration rate, a speed, and the like of the following vehicle mE; or some combination of information about mD before being lost and mE. The other vehicle position change prediction unit 113 sets a virtual vehicle mD# based on a position, an acceleration rate, a speed, and the like of the preceding vehicle mD before being lost; based on a position, an acceleration rate, a speed, and the like of the following vehicle mE; or some combination of information about mD before being lost and mE (right figure). At this time, the other vehicle position change prediction unit 113 may set a speed of the virtual vehicle mD# as the speed of the preceding vehicle mD before lost or may set the virtual vehicle mD# as a stationary body (the speed is zero).

Here, the description is provided on the assumption that the preceding vehicle mD and the following vehicle mE travel in the front in the own lane in the second embodiment. However, the preceding vehicle mD and the following vehicle mE may travel in a lane adjacent to the own lane or may travel behind the own vehicle M.

According to the vehicle control device 100 in the second embodiment described above, the vehicle control device 100 sets a virtual vehicle in the case where a preceding vehicle is lost so as to be able to accurately predict position change of peripheral vehicles as is the case with the first embodiment.

Third Embodiment

A third embodiment will be described below. In the case where a vehicle control device 100 according to the third embodiment predicts that a vehicle traveling behind (referred to below as the "following vehicle") catches up with a vehicle traveling immediately ahead of the following vehicle (referred to below as a "preceding vehicle") between two monitoring object vehicles, the vehicle control device 100 not only predicts that a following vehicle catches up with the preceding vehicle and performs following travel but also predicts that the following vehicle may perform lane change into an adjacent lane. Therefore, the other vehicle position change prediction unit 113 sets a virtual vehicle (second virtual vehicle) in an adjacent lane which is adjacent to a lane on which the following vehicle travels. Description is given below in a manner to focus on this difference.

Figure 12:
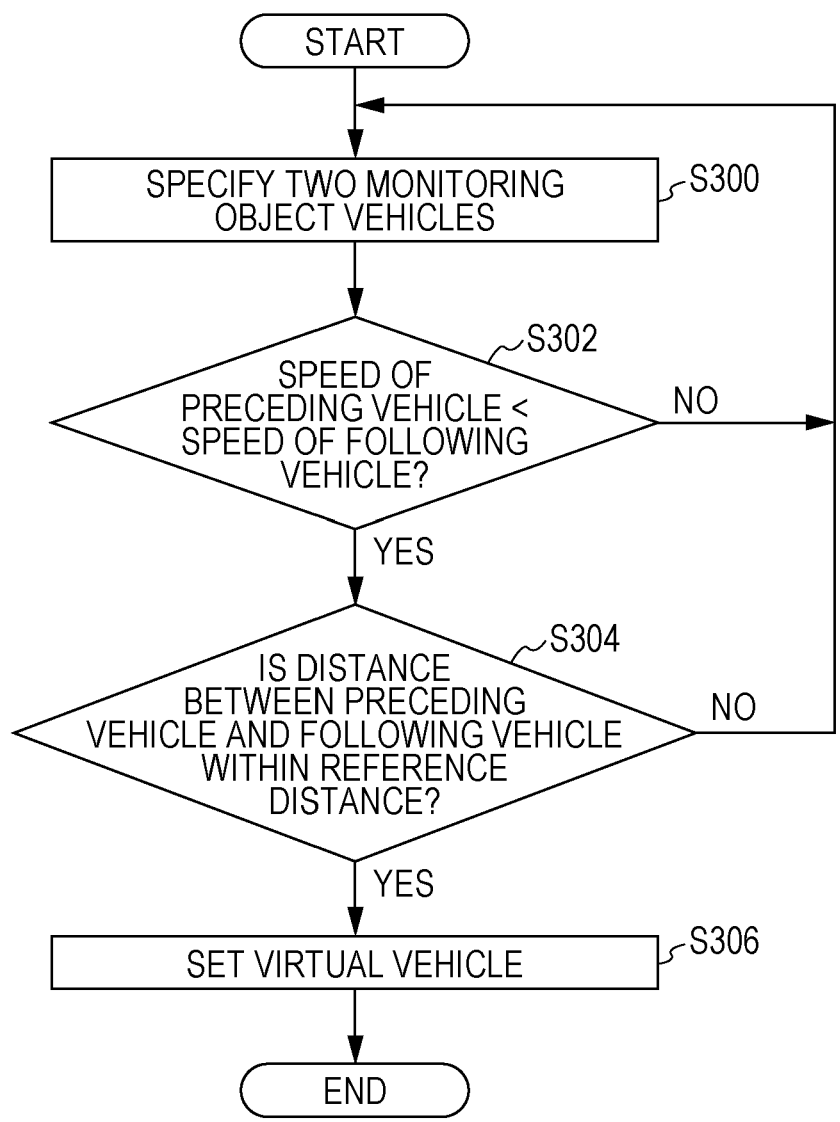
FIG. 12 is a flowchart illustrating a flow of processing executed by a vehicle control device according to a third embodiment.

FIG. 12 is a flowchart illustrating a flow of processing executed by the vehicle control device 100 according to the third embodiment. The other vehicle position change prediction unit 113 first specifies two peripheral vehicles which are detected by the detection unit DT and travel in a state that the two peripheral vehicles travel immediately ahead and immediately back of each other on the identical lane, as monitoring object vehicles (step S300).

Subsequently, the other vehicle position change prediction unit 113 determines whether or not a speed of the preceding vehicle is lower than a speed of the following vehicle between the monitoring object vehicles which are specified in step 3300 (step S302). When it is determined that the speed of the preceding vehicle is higher than the speed of the following vehicle between the monitoring object vehicles which are specified in step S300, the processing returns to the processing of step S300.

When it is determined that the speed of the preceding vehicle is lower than the speed of the following vehicle between the monitoring object vehicles which are specified in step S300, the other vehicle position change prediction unit 113 determines whether or not a distance between the preceding vehicle and the following vehicle is within a reference distance (step S304). In the case where the distance between the preceding vehicle and the following vehicle is not within the reference distance, the processing returns to the processing of step S300.

In the case where the distance between the preceding vehicle and the following vehicle is within the reference distance, the other vehicle position change prediction unit 113 sets a virtual vehicle which travels in parallel with the following vehicle in a lane adjacent to the lane on which the following vehicle travels (step S306). Then, the processing of the present flowchart is ended.

Figure 13:
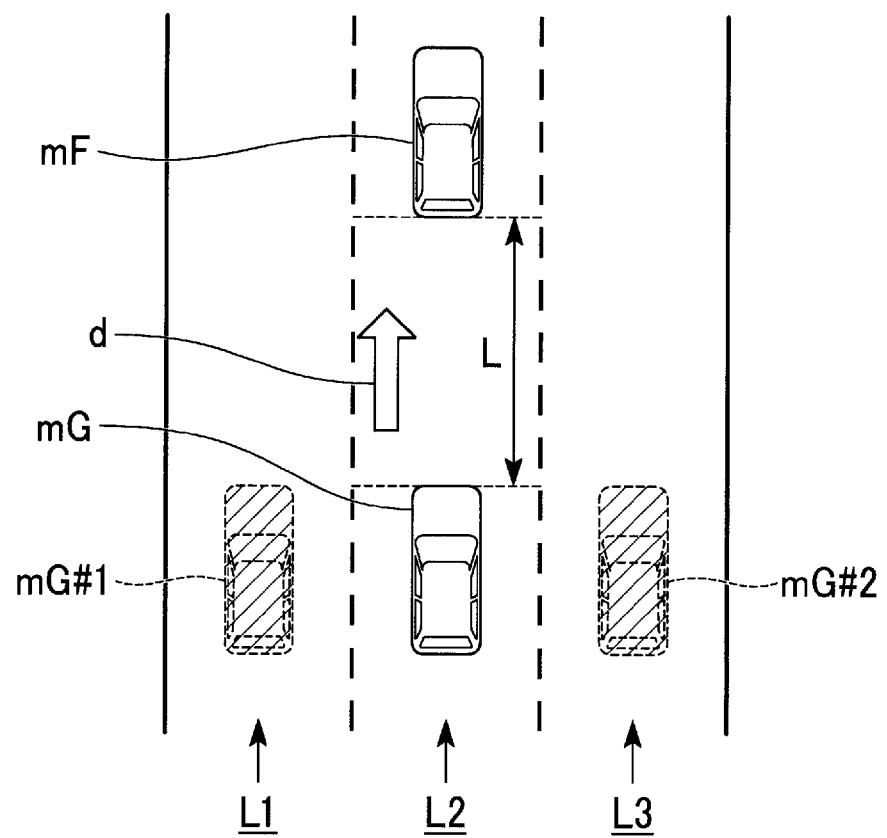
FIG. 13 illustrates setting positions of virtual vehicles.

FIG. 13 illustrates setting positions of virtual vehicles. The other vehicle position change prediction unit 113 sets virtual vehicles mG#1 and mG#2 which travel in parallel with a following vehicle mG respectively in lanes L1 and L3 which are adjacent to a lane on which the following vehicle mG travels. Here, in the case of two lanes, the other vehicle position change prediction unit 113 sets one virtual vehicle on a lane adjacent to the own lane.

When the following vehicle mG approaches a preceding vehicle mF, the following vehicle mG decelerates to avoid collision and travels in a manner to follow the preceding vehicle mF while keeping a "certain distance" to the preceding vehicle mF after the deceleration. In this case, the "reference distance ("L" in FIG. 13)" of step S304 may be longer than the "certain distance" or shorter than the "certain distance". In the case where the "reference distance" is longer than the "certain distance", the vehicle control device 100 can promptly predict lane change of the following vehicle mG so as to be able to enhance safety. Further, in the case where the "reference distance" is shorter than the "certain distance", the vehicle control device 100 can suppress prediction of lane change when the following vehicle mG has no intention of lane change so as to be able to prevent malfunction of the own vehicle M.

Here, either one of the determination of step S302 (determination of the set reference) and the determination of step 3304 (determination of the set reference) may be omitted. In the case where step S304 is omitted, for example, the other vehicle position change prediction unit 113 determines whether or not the speed of the following vehicle is higher than the speed of the preceding vehicle between the monitoring object vehicles which are specified in step S300 by a reference speed or higher (refer to step S302). In the case where the speed of the following vehicle is higher than the speed of the preceding vehicle between the monitoring object vehicles which are specified in step S300 by the reference speed or higher, the other vehicle position change prediction unit 113 sets a virtual vehicle which travels in parallel with the following vehicle, on a lane adjacent to the lane on which the following vehicle travels (refer to step 3306). In the case where the speed of the following vehicle is not higher than the speed of the preceding vehicle between the monitoring object vehicles which are specified in step S300 by the reference speed or higher, the processing returns to the processing of step 3300.

When the vehicle control device 100 according to the third embodiment described above predicts that a following vehicle catches up with a preceding vehicle traveling immediately ahead of the following vehicle, the vehicle control device 100 not only predicts that the following vehicle catches up with the preceding vehicle and performs following travel but also predicts that the following vehicle may perform lane change into an adjacent lane. Then, the vehicle control device 100 sets a virtual vehicle (the second virtual vehicle) on an adjacent lane which is adjacent to a lane on which the following vehicle travels. As a result, the vehicle control device 100 can predict lane change of the following vehicle and control the own vehicle M based on the prediction result.

Here, the first embodiment, second embodiment and the third embodiment may be combined with each other. For example, when the preceding vehicle is lost, the vehicle control device 100 sets a virtual vehicle ahead of the following vehicle. In addition to this, in the case where the preceding vehicle or the virtual vehicle and the following vehicle satisfy the set reference, the vehicle control device 100 may set a virtual vehicle on an adjacent lane of the following vehicle. The case where the preceding vehicle or the virtual vehicle and the following vehicle satisfy the set reference represents a case where a distance between the preceding vehicle or the virtual vehicle and the following vehicle is within a reference distance, a case where the speed of the following vehicle is higher than the speed of the preceding vehicle or the virtual vehicle by the reference speed or higher, and the like, for example. These virtual vehicles may be used in generating path predictions for lane changing for an own vehicle. For example, the path of a virtual vehicle may be used when determining a lane changeable region.

The embodiments of the present disclosure have been described thus far by using the examples. However, the present disclosure is not limited to these embodiments but various alterations and substitutions may be applied within the scope of the substance of the present disclosure.

What is claimed is:

1. A method of controlling a vehicle to perform operations comprising:
    detecting first and second vehicles which are traveling around a host vehicle to provide positional information of the first and second vehicles;
    determining positional relationship information with respect to the first vehicle and the second vehicle based on the positional information; and
    predicting a future position of the second vehicle based on the positional relationship information, wherein
    in a case where the positional relationship information indicates that the second vehicle is traveling in immediately back of the first vehicle and is predicted to catch up with the first vehicle, the future position of the second vehicle is predicted based on an assumption that the second vehicle travels in a manner to follow the first vehicle while keeping a certain distance with respect to the first vehicle after the second vehicle catches up with the first vehicle, and
    in a case where the detection of the first vehicle is lost after the positional relationship information is determined, the vehicle control device sets a first virtual vehicle corresponding to the first vehicle based on the positional information thereof obtained before the detection of the first vehicle is lost and predicts the future position of the second vehicle on an assumption that the second vehicle travels in a manner to follow the first virtual vehicle while keeping the certain distance with respect to the first virtual vehicle after the second vehicle catches up with the first virtual vehicle.

2. The method according to claim 1 to further perform operations comprising:
calculating a possible path of the host vehicle, wherein the possible path includes changing a lane of the host vehicle so as to place the host vehicle in front of the future position of the second vehicle.

3. The method according to claim 2, wherein the path maintains a distance between the host vehicle and the future position of the second vehicle.

4. The method according to claim 3, wherein the path maintains a distance between the host vehicle and a future position of the first vehicle.

5. The method according to claim 2 to further perform operations comprising:
providing data regarding the possible path of the host vehicle to at least one other control device in the host vehicle to cause the host vehicle to start following the possible path.

6. The method according to claim 1, wherein a detection unit is provided to perform the detecting the first and second vehicles, and the determining positional information of the first and second vehicles; and, wherein a prediction unit is provided to perform the determining the positional relationship information and the predicting the future position of the second vehicle.

7. A method of controlling a vehicle to perform operations comprising:
detecting first and second vehicles which are traveling around a host vehicle to provide positional information of the first and second vehicles;
determining positional relationship information with respect to the first vehicle and the second vehicle based on the positional information; and
predicting a future position of the second vehicle based on the positional relationship information, wherein
in a case where the positional relationship information indicates that the second vehicle is traveling in immediately back of the first vehicle and is predicted to catch up with the first vehicle, the future position of the second vehicle is predicted based on an assumption that the second vehicle travels in a manner to follow the first vehicle while keeping a certain distance with respect to the first vehicle after the second vehicle catches up with the first vehicle, and
in a case where a distance between the first vehicle and the second vehicle becomes a predetermined distance or less, a second virtual vehicle is set on a lane adjacent to a lane on which the second vehicle travels.

8. A method of controlling a vehicle to perform operations comprising:
detecting first and second vehicles which are traveling around a host vehicle to provide positional information of the first and second vehicles;
determining positional relationship information with respect to the first vehicle and the second vehicle based on the positional information; and
predicting a future position of the second vehicle based on the positional relationship information, wherein
in a case where the positional relationship information indicates that the second vehicle is traveling in immediately back of the first vehicle and is predicted to catch up with the first vehicle, the future position of the second vehicle is predicted based on an assumption that the second vehicle travels in a manner to follow the first vehicle while keeping a certain distance with respect to the first vehicle after the second vehicle catches up with the first vehicle, and
in a case where a speed of the second vehicle is higher than a speed of the first vehicle by a predetermined speed or higher, a second virtual vehicle is set on a lane adjacent to a lane on which the second vehicle travels.

* * * * *